United States Patent [19]
Jaffe et al.

[11] Patent Number: 5,166,939
[45] Date of Patent: Nov. 24, 1992

[54] DATA STORAGE APPARATUS AND METHOD

[75] Inventors: David H. Jaffe, Belmont; David T. Powers, Morgan Hill; Kumar Gajjar, San Jose; Joseph S. Glider, Mountain View; Thomas E. Idleman, Santa Clara, all of Calif.

[73] Assignee: Micro Technology, Inc., Anaheim, Calif.

[21] Appl. No.: 488,749

[22] Filed: Mar. 2, 1990

[51] Int. Cl.⁵ .............................................. G06F 7/22
[52] U.S. Cl. ................................ 371/40.1; 371/40.4; 371/10.2
[58] Field of Search .................... 371/40.1, 40.2, 40.4, 371/10.1, 10.2, 11.1; 364/200, 900

[56] References Cited
U.S. PATENT DOCUMENTS

| | | | |
|---|---|---|---|
| 4,467,421 | 8/1984 | White | 364/200 |
| 4,819,205 | 4/1989 | McRoberts | 371/10.2 X |
| 4,849,929 | 7/1989 | Timsit | 371/10.1 X |
| 4,899,342 | 2/1990 | Potter | 371/40.1 X |
| 4,914,656 | 4/1990 | Dunphy | 371/40.1 X |
| 4,958,351 | 9/1990 | Flora | 371/40.1 |

Primary Examiner—Robert W. Beausoliel
Assistant Examiner—Allen M. Lo
Attorney, Agent, or Firm—Mark D. Rowland

[57] ABSTRACT

A mass storage apparatus, made up of a plurality of physical storage devices, which is capable of providing both high bandwidth and high operation rate, as necessary, along with high reliability, is provided. The device set is divided into one or more redundancy groups. Each redundancy group is in turn divided into one or more data groups, each of which may span only a small number of the drives in the redundancy group, providing a high request rate, or which may span a large number of drives, providing high bandwidth.

42 Claims, 7 Drawing Sheets

DATA STORAGE APPARATUS AND METHOD

BACKGROUND OF THE INVENTION

This invention relates to mass data storage devices. In particular, this invention relates to sets of physical mass storage devices that collectively perform as one or more logical mass storage devices. More particularly, this invention relates to improving the flexibility, transaction/bandwidth performance, speed and reliability of such sets of physical mass data storage devices.

It is known that a plurality of mass data storage devices can be operated as a single logical mass data storage device. Such devices can be disk drives or any other mass data storage technology, including tape or other technology. When a set of such devices is operated collectively as a logical device, data stored in a write operation can be spread across one or more members of the set.

One of the advantages of such sets is that data can be stored or retrieved faster because they can be written or read in parallel to or from all the physical devices. Another advantage of such sets is that they may be more tolerant of physical failures. For example, if one physical device fails, it may still be possible to read and write the other members of the set. Further, by storing redundant information in the set, one can increase the probability of being able to recover data stored on a failed physical device. The redundant information may take the form of mirrored or shadowed data, in which case data stored on any device of the set is duplicated on another device of the set. Alternatively, the amount of redundant information stored in the set may be reduced by storing what is commonly referred to as check data. Such check data typically comprises code words that are constructed by encoding the data stored in the set. Reconstruction of data that was stored on a failed device is attained by mathematically extracting the missing data from the code words.

Another advantage of using a plurality of physical devices as a logical device is that the ratio of read/write heads per unit of mass storage is increased. As a result of having a greater density of such actuators each capable of independently accessing data, it becomes possible for the logical device to handle a larger number of data requests simultaneously. This is advantageous in applications such as data bases and on-line transaction processing that require high aggregate request/second rates.

The use of a number of physical devices in parallel can, depending on the configuration, also give such sets potentially high bandwidth—i.e., a lot of data can be written or read at the same time. High bandwidth is advantageous for some applications, such as real-time analysis, numerical analysis and image processing. A known technique for providing high bandwidth in such a device set is to store data by interleaving data blocks across the devices of the set, such that the blocks are sequentially stored in round robin fashion throughout the set. This is also known as striping the data.

However, while sets of physical mass storage devices potentially have the above advantages, among others, known techniques for organizing and backing up data in such sets do not provide flexibility in optimizing these advantages for different applications. They also do not exploit the full range of data organizations that are possible in such a device set. In other words, a mass storage apparatus made up of a plurality of physical storage devices may be called upon to operate as a logical storage device for two concurrently-running applications having different data storage needs—for example, one application requiring large data transfers (i.e., high bandwidth), and the other requiring high frequency transfers (i.e., high operation rate). A third application may call upon the apparatus to provide both high bandwidth and high operating rate. Known operating techniques for physical device sets do not provide the capability of dynamically configuring a single set of physical storage devices to provide optimal service in response to such varied needs.

It would therefore be desirable to be able to provide a mass storage apparatus, made up of a plurality of physical storage devices, which could flexibly provide both high bandwidth and high operation rate, as necessary, along with high reliability.

SUMMARY OF THE INVENTION

It is an object of this invention to provide a mass storage apparatus, made up of a plurality of physical storage devices, which can flexibly provide both high bandwidth and high operation rate, as necessary, along with high reliability.

In accordance with the present invention, there is provided a mass data storage apparatus comprising a number of physical mass data storage devices operatively interconnected so as to function at a first logical level as one or more logical redundancy groups. The width, depth and redundancy type (e.g., mirrored data or check data) of each logical redundancy group, and the location of redundant information therein, are independently configurable to meet desired capacity and reliability requirements. At a second logical level, blocks of mass storage data are grouped into one or more logical data groups. A logical redundancy group may be divided into more than one such data group. The width, depth, addressing sequence and arrangement of data blocks in each logical data group are independently configurable to divide the mass data storage apparatus into multiple logical mass storage areas each having potentially different bandwidth and operation rate characteristics.

A third logical level, for interacting with application software of a host computer operating system, is also provided. The application level superimposes logical application units on the data groups to allow data groups, alone or in combination from one or more redundancy groups, to appear to application software as a single logical storage unit. A method of operating such an apparatus is also provided.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The present invention allows a set of physical mass data storage devices to be dynamically configured as one or more logical mass storage devices. In accordance with the present invention, such a set of physical devices is configurable as one or more redundancy groups and each redundancy group is configurable as one or more data groups.

A redundancy group, as previously used in known device sets, is a group of physical devices all of which share the same redundant device set. A redundant device is a device that stores duplicated data or check data for purposes of recovering stored data if one or more of the physical devices of the group fails.

Where check data is involved, the designation of a particular physical device as a redundant device for an entire redundancy group requires that the redundant device be accessed for all write operations involving any of the other physical devices in the group. Therefore, all write operations for the group interfere with one another, even for small data accesses that involve less than all of the data storage devices.

Figure 1:
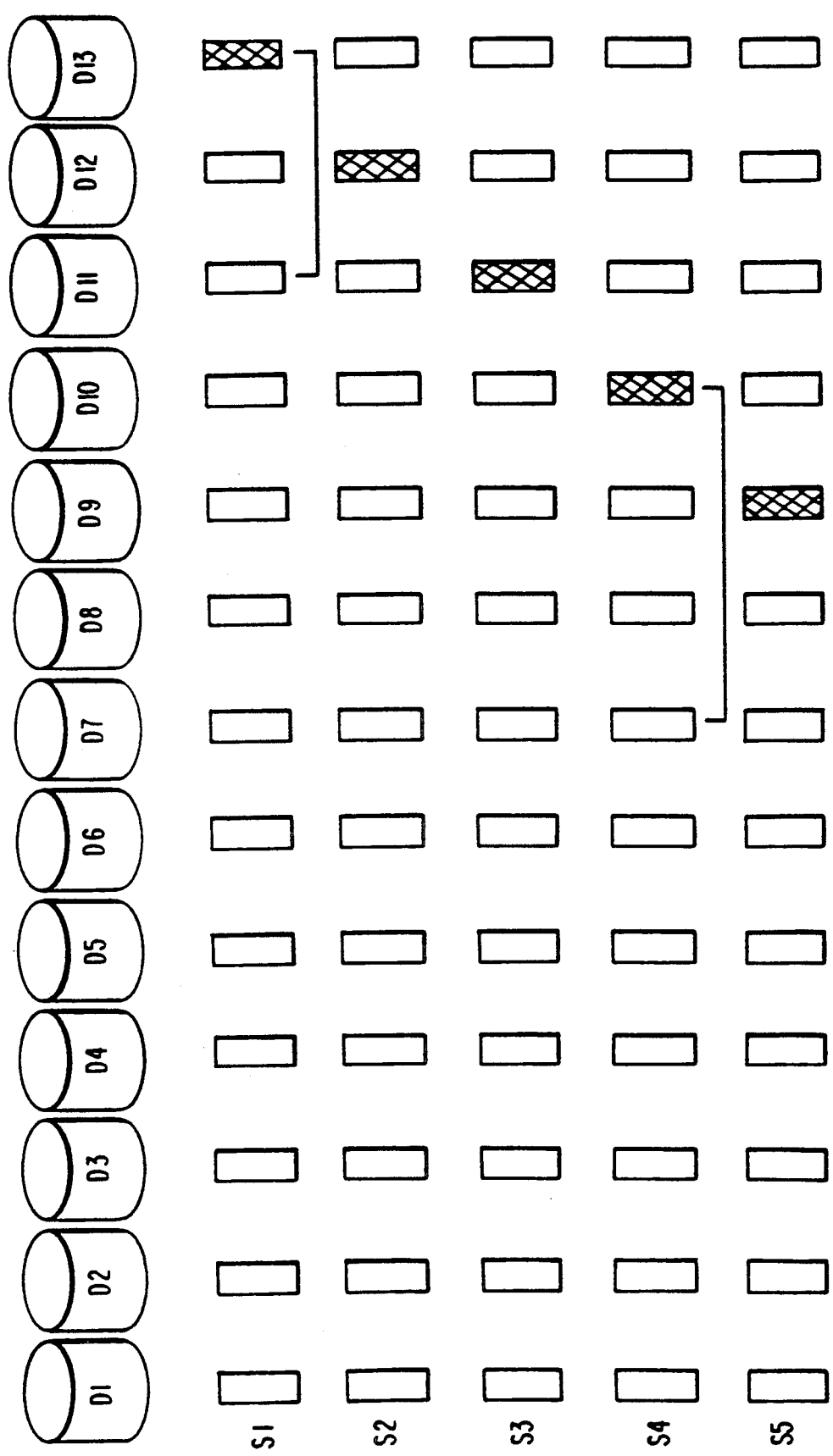
FIG. 1 is a schematic diagram of a set of disk drives in which check data is distributed among drives of the set according to a known technique.

It is known to avoid this contention problem on write operations by distributing check data throughout the redundancy group, thus forming a logical redundant device comprising portions of several or all devices of the redundancy group. For example, FIG. 1 shows a group of 13 disk storage devices. The columns represent the various disks D1–D13 and the rows represent different sectors S1–S5 on the disks. Sectors containing check data are shown as hatched. Sector S1 of disk D13 contains check data for sectors S1 of disks D1–D12. Likewise, the remaining hatched sectors contain check data for their respective sector rows. Thus, if data is written to sector S4 of disk D7, then updated check data is written into sector S4 of disk D10. This is accomplished by reading the old check data, re-coding it using the new data, and writing the new check data to the disk. This operation is referred to as a read-modify-write. Similarly, if data is written to sector S1 of disk D11, then check data is written into sector S1 of disk D13. Since there is no overlap in this selection of four disks for writes, both read-modify-write operations can be performed in parallel.

A distribution of check data in a redundancy group in the manner shown in FIG. 1 is known as a striped check data configuration. The term "striped redundancy group" will be used herein to refer generally to a redundancy group in which check data is arranged in a striped configuration as shown in FIG. 1, and the term "redundancy group stripe depth" will be used herein to refer to the depth of each check data stripe in such a striped redundancy group.

In previously known device sets, it was known to provide the whole set as a single redundancy group. It has been found that a redundancy group can be divided into various "extents", each defined as a portion of the depth of the redundancy group and each capable of having a configuration of check data different from that of other extents in the same redundancy group. Moreover, it has been found that more than one redundancy group can be provided in a single device set, under the control of a single "array controller", and connected to a main processing unit via one or more device controllers.

Similarly, in previously known device sets, the single redundancy group included only one data group for application data—i.e., the device set operated as a single logical device. It has been found, however, that a redundancy group can be broken up into multiple data groups, each of which can operate as a separate logical storage device or as part of a larger logical storage device. A data group can include all available mass storage memory on a single physical device (i.e., all memory on the device available for storing application data), or it can include all available mass storage memory on a plurality of physical devices in the redundancy group. Alternatively, as explained more fully below, a data group can include several physical devices, but instead of including all available mass storage memory of each device might only include a portion of the available mass storage memory of each device. In addition, it has been found that it is possible to allow data groups from different redundancy groups to form a single logical device. This is accomplished, as will be more fully described, by superimposing an additional logical layer on the redundancy and data groups.

Moreover, in previously known device sets in which application data is interleaved across the devices of the set, the data organization or geometry is of a very simple form. Such sets generally do not permit different logical organizations of application data in the same logical unit nor do they permit dynamic mapping of the logical organization of application data in a logical unit. It has been found that the organization of data within a data group can be dynamically configured in a variety of ways. Of particular importance, it has been found that the data stripe depth of a data group can be made independent of redundancy group stripe depth, and can be varied from one data group to another within a logical unit to provide optimal performance characteristics for applications having different data storage needs.

Figure 2:
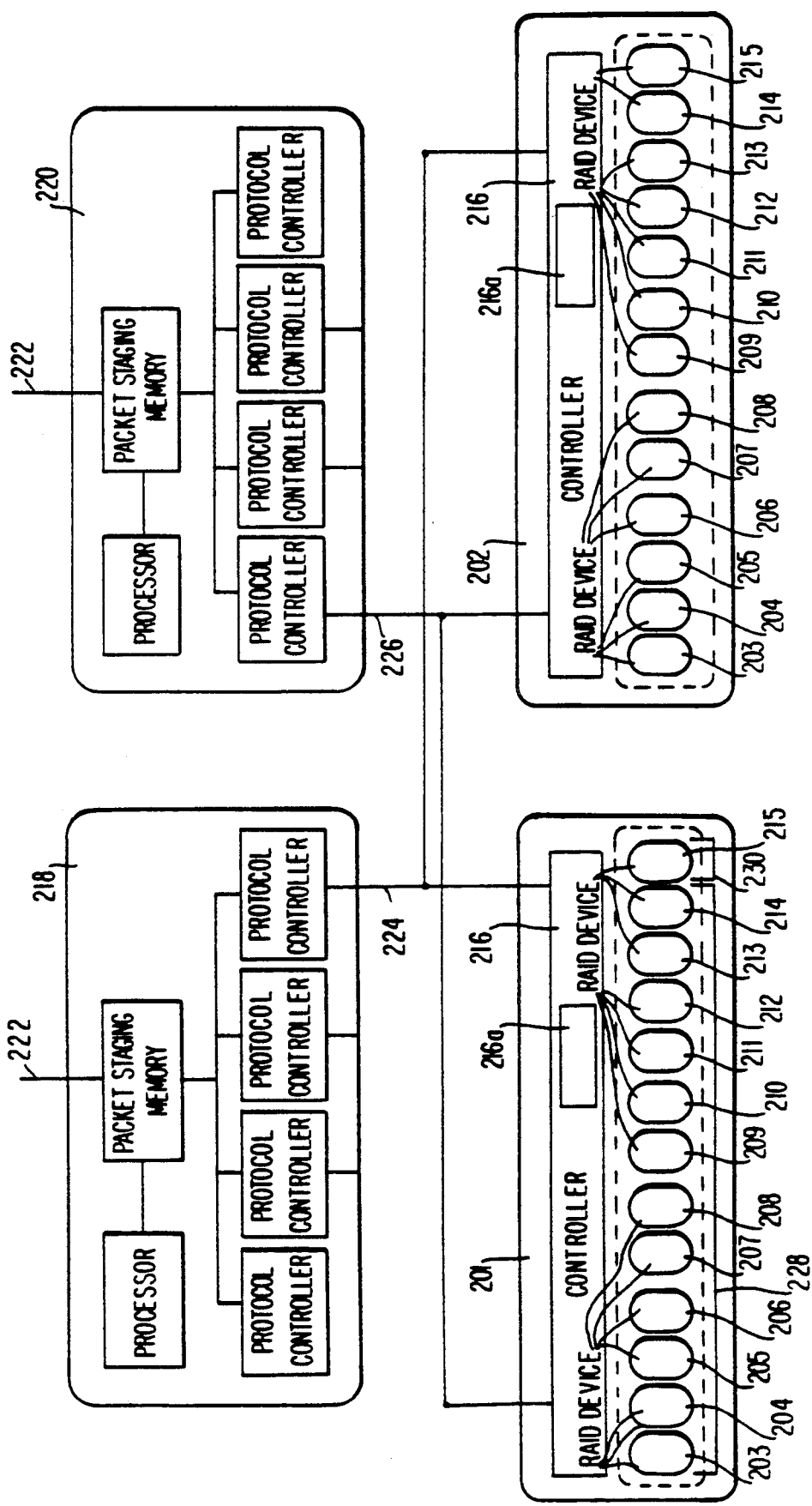
FIG. 2 is a schematic diagram of a mass storage system suitable for use with the present invention.

An embodiment of a mass storage system 200 including two parallel arrays 201 and 202 is shown in the block diagram of FIG. 2. As seen in FIG. 2, each of parallel arrays 201 and 202 includes thirteen physical drives 203–215 and a parallel array controller 216. Parallel array controller 216 includes a microprocessor 216a which controls how data is written and validated across the drives of the parallel array. Microprocessor 216a also controls the update or regeneration of data when one of the physical drives malfunctions or loses synchronization with the other physical drives of the parallel array. In accordance with the present invention, microprocessor 216a in each parallel array controller 216 also controls the division of parallel arrays 201 and 202 into redundancy groups, data groups and application units. The redundancy groups, data groups and application units can be configured initially by the system operator when the parallel array is installed, or they can be configured at any time before use during run-time of the parallel array. Configuration can be accomplished, as described in greater detail below, by defining certain configuration parameters that are used in creating various address maps in the program memory of microprocessor 216a and, preferably, on each physical drive of the parallel array.

Each of parallel arrays 201 and 202 is connected to a pair of device controllers 218 and 220. Each device controller is in turn connected by a bus or channel 222 to a CPU main memory. In general, each parallel array is attached to at least two device controllers so that there are at least two parallel paths from one or more CPU main memories to that parallel array. Thus, for example, each of the parallel arrays 200 and 202 is connected to device controllers 218 and 220 by buses 224 and 226. Such parallel data paths from a CPU to the parallel array are useful for routing data around a busy or failed device controller.

Within each parallel array are an active set 228 comprising disk drive units 203-214, and a backup set 230 comprising disk drive unit 215. Parallel array controller 216 routes data between device controllers 218 and 220 and the appropriate one or ones of disk drive units 203-215. Device controllers 218 and 220 interface parallel arrays 201 and 202 to the main memories of one or more CPUs, and are responsible for processing I/O requests from applications being run by those CPUs. A further description of various components of the apparatus of parallel arrays 201 and 202 and device controllers 218 and 220 can be found in the following co-pending, commonly assigned U.S. patent applications filed concurrently herewith and incorporated herein in their entirety by reference: Ser. No. 07/487,648, entitled "NON-VOLATILE MEMORY STORAGE OF WRITE OPERATION IDENTIFIER IN DATA STORAGE DEVICE," filed in the names of David T. Powers, Randy Katz, David H. Jaffe, Joseph S. Glider and Thomas E. Idleman; and Ser. No. 07/488,750, entitled "DATA CORRECTIONS APPLICABLE TO REDUNDANT ARRAYS OF INDEPENDENT DISKS," filed in the names of David T. Powers, Joseph S. Glider and Thomas E. Idleman.

Figure 3:
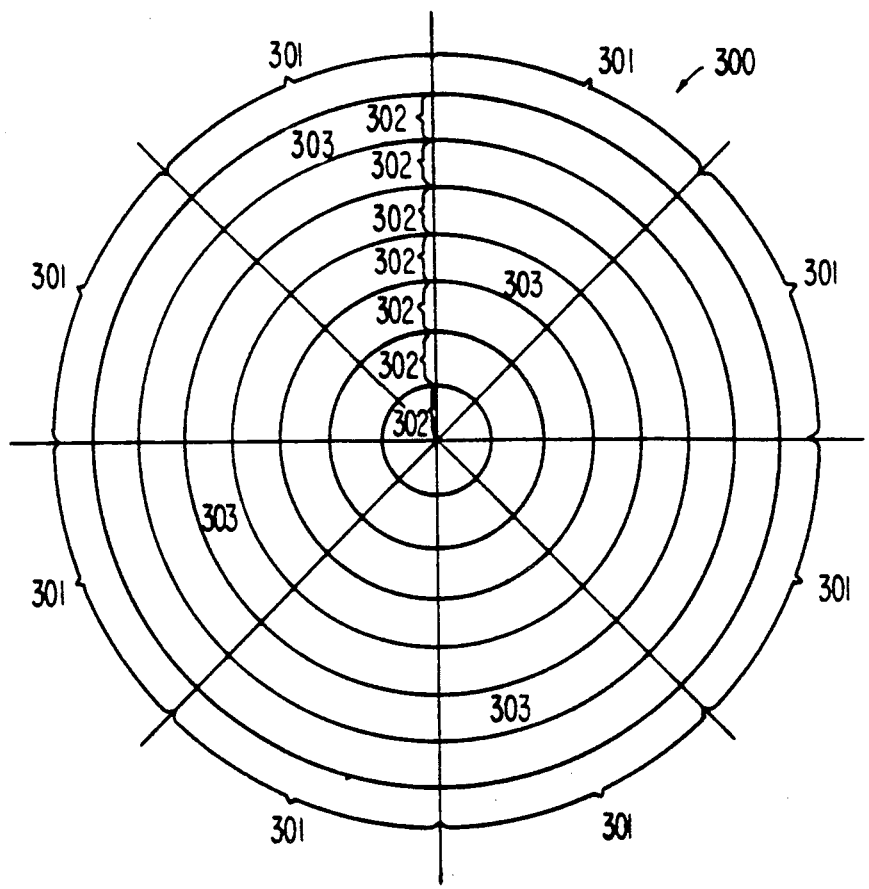
FIG. 3 is a schematic diagram of the distribution of data on the surface of a magnetic disk.

In order to understand how data is spread among the various physical drives of an active set 230 of a parallel array 201 or 202, it is necessary to understand the geometry of a single drive. FIG. 3 shows one side of the simplest type of disk drive—the single platter drive. Some disk drives in personal computers are of this type, having a single disk-shaped "platter" on both sides of which data can be stored. In more complex drives, there may be several platters on one "spindle," which is the central post about which the platters spin.

As shown in FIG. 3, each side 300 of a disk platter is divided into geometric angles 301, of which eight are shown in FIG. 3, but of which there could be some other number. Side 300 is also divided into ring-shaped "tracks" of substantially equal width, of which seven are shown in FIG. 3. The intersection of a track and a geometric angle is known as a sector and typically is the most basic unit of storage in a disk drive system. There are fifty-six sectors 303 shown in FIG. 3.

A collection of tracks 302 of equal radius on several sides 300 of disk platters on a single spindle make up a "cylinder." Thus, in a single-platter two-sided drive, there are cylinders of height=2, the number of cylinders equalling the number of tracks 302 on a side 300. In a two-platter drive, then, the cylinder height would be 4. In a one-sided single-platter drive, the cylinder height is 1.

Figure 4:
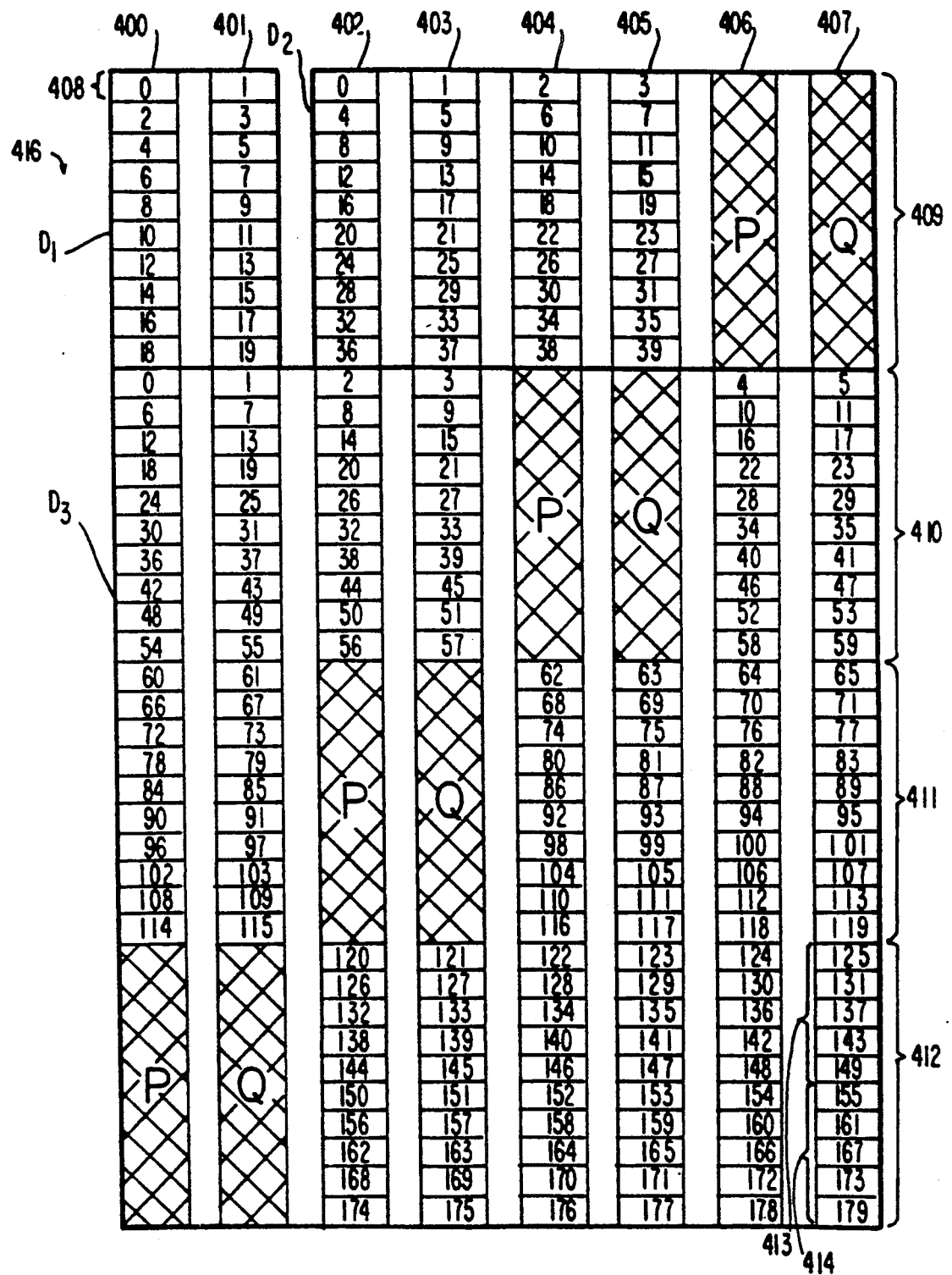
FIG. 4 is a schematic diagram of the distribution of data in a first preferred embodiment of a redundancy group according to the present invention.

A disk drive is read and written by "read/write heads" that move over the surfaces of sides 300. FIG. 4 shows the distribution of data sub-units—sectors, tracks and cylinders—in a group 416 of eight single-platter two-sided drives 400-407 in a manner well-suited to illustrate the present invention. Drives 400-407 may, for example, correspond to drive units 203-210 of parallel array 201 or 202. Each of the small horizontal divisions represents a sector 408. For each drive, four cylinders 409-412 are shown, each cylinder including two tracks 413 and 414, each track including five sectors.

In the preferred embodiment shown in FIG. 4, group 416 comprises a single redundancy group in which two types of redundancy data, referred to as "P" check data and "Q" check data, are used to provide data redundancy. The P and Q check data are the results of a Reed-Solomon coding algorithm applied to the mass storage data stored within the redundancy group. The particular method of redundancy used is implementation specific, and not part of the present invention. As shown, the redundancy data is distributed across all spindles, or physical drives, of group 416, thus forming two logical check drives for the redundancy group comprising group 416. For example, the P and Q check data for the data in sectors 408 of cylinders 409 of drives 400-405 are contained respectively in cylinders 409 of drives 406 and 407. Each time data is written to any sector 408 in any one of cylinders 409 of drives 400-405, a read-modify-write operation is performed on the P and Q check data contained in corresponding sectors of drives 406 and 407 to update the redundancy data.

Likewise, cylinders 410 of drives 400-407 share P and Q check data contained in cylinders 410 of drives 404 and 405; cylinders 411 of drives 400-407 share P and Q check data contained in cylinders 411 of drives 402 and 403; and cylinders 412 of drives 400-407 share P and Q check data contained in cylinders 412 of drives 400 and 401.

Three data groups D1-D3 are shown in FIG. 4. Data group D1 includes cylinders 409 of each of spindles 400, 401. Data group D2 includes cylinders 409 of each of spindles 402, 403. Data group D3 includes all remaining cylinders of spindles 400-407, with the exception of those cylinders containing P and Q check data. Data group D1 has a two-spindle bandwidth, data group D2 has a four-spindle bandwidth and data group D3 has a six-spindle bandwidth. Thus it is shown in FIG. 4 that, in accordance with the principles of the present invention, a redundancy group can comprise several data groups of different bandwidths. In addition, each of data groups D1-D3 may alone, or in combination with any other data group or groups, comprise a separate logical storage device. This can be accomplished by defining each data group or combination as an individual application unit. Application units are discussed in greater detail below.

In FIG. 4, sectors 408 are numbered within each data group as a sequence of logical data blocks. This sequence is defined when the data groups are configured, and can be arranged in a variety of ways. FIG. 4 presents a relatively simple arrangement in which the sectors within each of data groups D1-D3 are numbered from left to right in stripes crossing the width of the respective data group, each data stripe having a depth of one sector. This arrangement permits for the given bandwidth of each data group a maximum parallel transfer rate of consecutively numbered sectors.

The term "data group stripe depth" is used herein to describe, for a given data group, the number of logically contiguous data sectors stored on a drive within the boundaries of a single stripe of data in that data group. In accordance with the principles of the present invention, the depth of a data group stripe may be lesser than, greater than or equal to the depth of redundancy group stripe. As one example of this, FIG. 4 shows that data groups D1-D3 each has a data group stripe depth of one sector, and are all included in a redundancy group having a redundancy group stripe depth of one cylinder.

Redundancy group 416 can handle up to six data read requests simultaneously—one from each of spindles 400-405—because the read/write heads of the spindles can move independently of one another. Redundancy group 416 as configured in FIG. 4 also can handle certain combinations of write requests simultaneously. For example, in many instances any data sector of data group D1 can be written simultaneously with any data sectors of data group D3 contained on spindles 402-405 that are not backed up by P or Q check data on spindles 400, 401, 406 or 407.

Redundancy group 416 as configured in FIG. 4 usually can not handle simultaneous write operations to sectors in data groups D1 and D2, however, because to perform a write operation in either of these data groups, it is necessary to write to drives 406 and 407 as well. Only one write operation can be performed on the check data of drives 406, 407 at any one time, because the read/write heads can only be in one place at one time. Likewise, regardless of the distribution of data groups, write operations to any two data sectors backed up by check data on the same drive can not be done simultaneously. The need for the read/write heads of the check drives to be in more than one place at one time can be referred to as "collision."

It is to be understood that the above-described restriction concerning simultaneous writes to different data drives sharing common check drives is peculiar to check drive systems, and is not a limitation of the invention. For example, the restriction can be avoided by implementing the invention using a mirrored redundancy group, which does not have the property that different data drives share redundancy data on the same drive.

Figure 5:
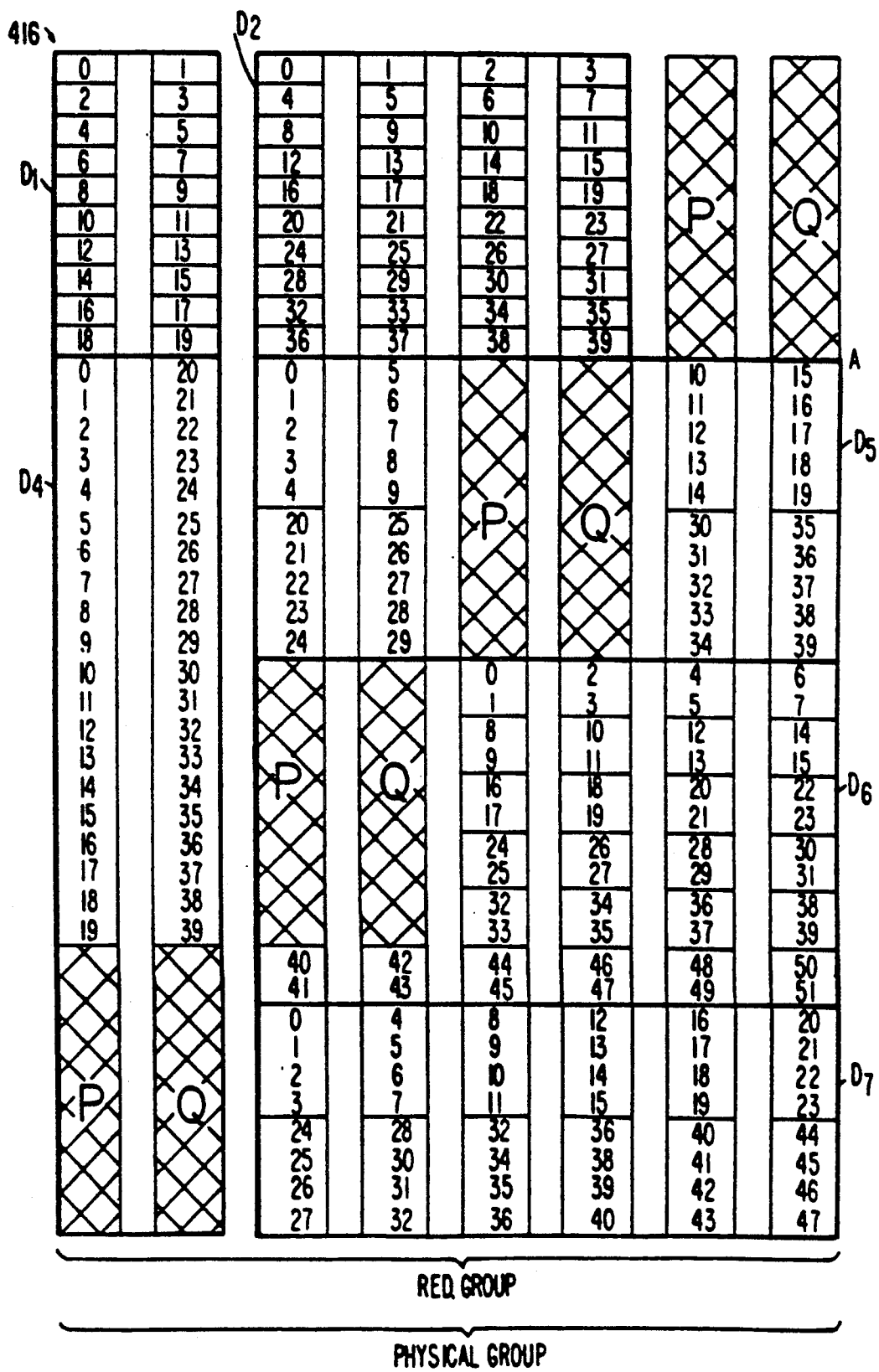
FIG. 5 is a schematic diagram of the distribution of data in a second, more particularly preferred embodiment of a redundancy group according to the present invention.

FIG. 5 shows a more particularly preferred embodiment of redundancy group 416 configured according to the present invention. In FIG. 5, as in FIG. 4, the logical check "drives" are spread among all of spindles 400-407 on a per-cylinder basis, although they could also be on a per-track basis or even a per-sector basis.

Data groups D1 and D2 are configured as in FIG. 4. The sectors of data group D3 of FIG. 4, however, have been divided among four data groups D4-D7. As can be seen in FIG. 5, the sequencing of sectors in data groups D4-D7 is no longer the same as the single-sector-deep striping of data groups D1 and D2. Data group D4 has a data group stripe depth of 20 sectors—equal to the depth of the data group itself. Thus, in data group D4 logically numbered sectors 0-19 can be read consecutively by accessing only a single spindle 400, thereby allowing the read/write heads of spindles 401-407 to handle other transactions. Data groups D5, D6 and D7 each show examples of different intermediate data group stripe depths of 5 sectors, 2 sectors and 4 sectors, respectively.

The distribution of the check data over the various spindles can be chosen in such a way as to minimize collisions. Further, given a particular distribution, then to the extent that parallel array controller 216 has a choice in the order of operations, the order can be chosen to minimize collisions.

The distribution of redundancy groups and data groups over the active set 230 of a parallel array 201 or 202 can be parameterized. For example, the redundancy group can be characterized by a redundancy group width (in spindles), representing the number of spindles spanned by a particular set of check data, a redundancy group depth (in any subunit—sector, track or cylinder) and a redundancy group stripe depth (also in any subunit—sector, track or cylinder). Data groups can be characterized by width (in spindles), depth (in any subunit—sector, track or cylinder), and data group stripe depth (also in any subunit—sector, track or cylinder). Because data groups do not start only at the beginning of active set 230, they are also characterized by a "base", which is a two-parameter indication of the spindle and the offset from the beginning of the spindle at which the data group starts. A redundancy group may, like a data group, include less than all of an entire spindle. In addition, as previously stated herein, a redundancy group may be divided into a plurality of extents. The extents of a redundancy group have equal widths and different bases and depths. For each extent, the distribution of check data therein can be independently parameterized. In the preferred embodiment, each redundancy group extent has additional internal parameters, such as the depth of each redundancy group stripe within the redundancy group extent and the drive position of the P and Q check data for each such redundancy group stripe.

Redundancy group width reflects the trade-off between reliability and capacity. If the redundancy group width is high, then greater capacity is available, because only two drives out of a large number are used for check data, leaving the remaining drives for data. At the other extreme, if the redundancy group width=4, then a situation close to mirroring or shadowing, in which 50% of the drives are used for check data, exists (although with mirroring if the correct two drives out of four fail, all data on them could be lost, while with check data any two drives could be regenerated in that situation). Thus low redundancy group widths represent greater reliability, but lower capacity per unit cost, while high redundancy group widths represent greater capacity per unit cost with lower, but still relatively high, reliability.

Data group width reflects the trade-off discussed above between bandwidth and request rate, with high data group width reflecting high bandwidth and low data group width reflecting high request rates.

Data group stripe depth also reflects a trade-off between bandwidth and request rate. This trade-off varies depending on the relationship of the average size of I/O requests to the data group and the depth of data stripes in the data group. The relationship of average I/O request size to the data group stripe depth governs how often an I/O request to the data group will span more than one read/write head within the data group; it thus also governs bandwidth and request rate. If high bandwidth is favored, the data group stripe depth is preferably chosen such that the ratio of average I/O request size to stripe depth is large. A large ratio results in I/O requests being more likely to span a plurality of data drives, such that the requested data can be accessed at a higher bandwidth than if the data were located all on one drive. If, on the other hand, a high request rate is favored, the data group stripe depth is preferably chosen such that the ratio of I/O request size to data group stripe depth is small. A small ratio results in a lesser likelihood that an I/O request will span more than one data drive, thus increasing the likelihood that multiple I/O requests to the data group can be handled simultaneously.

The variance of the average size of I/O requests might also be taken into account in choosing data group stripe depth. For example, for a given average I/O request size, the data group stripe depth needed to achieve a desired request rate might increase with an increase in I/O request size variance.

In accordance with the present invention, the flexibility of a mass storage apparatus comprising a plurality of physical mass storage devices can be further enhanced by grouping data groups from one or from different redundancy groups into a common logical unit, referred to herein as an application unit. Such application units can thus appear to the application software of an operating system as a single logical mass storage unit combining the different operating characteristics of various data groups. Moreover, the use of such application units permits data groups and redundant groups to be configured as desired by a system operator independent of any particular storage architecture expected by application software. This additional level of logical grouping, like the redundancy group and data group logical levels, is controlled by parallel array controller 216.

Figure 6:
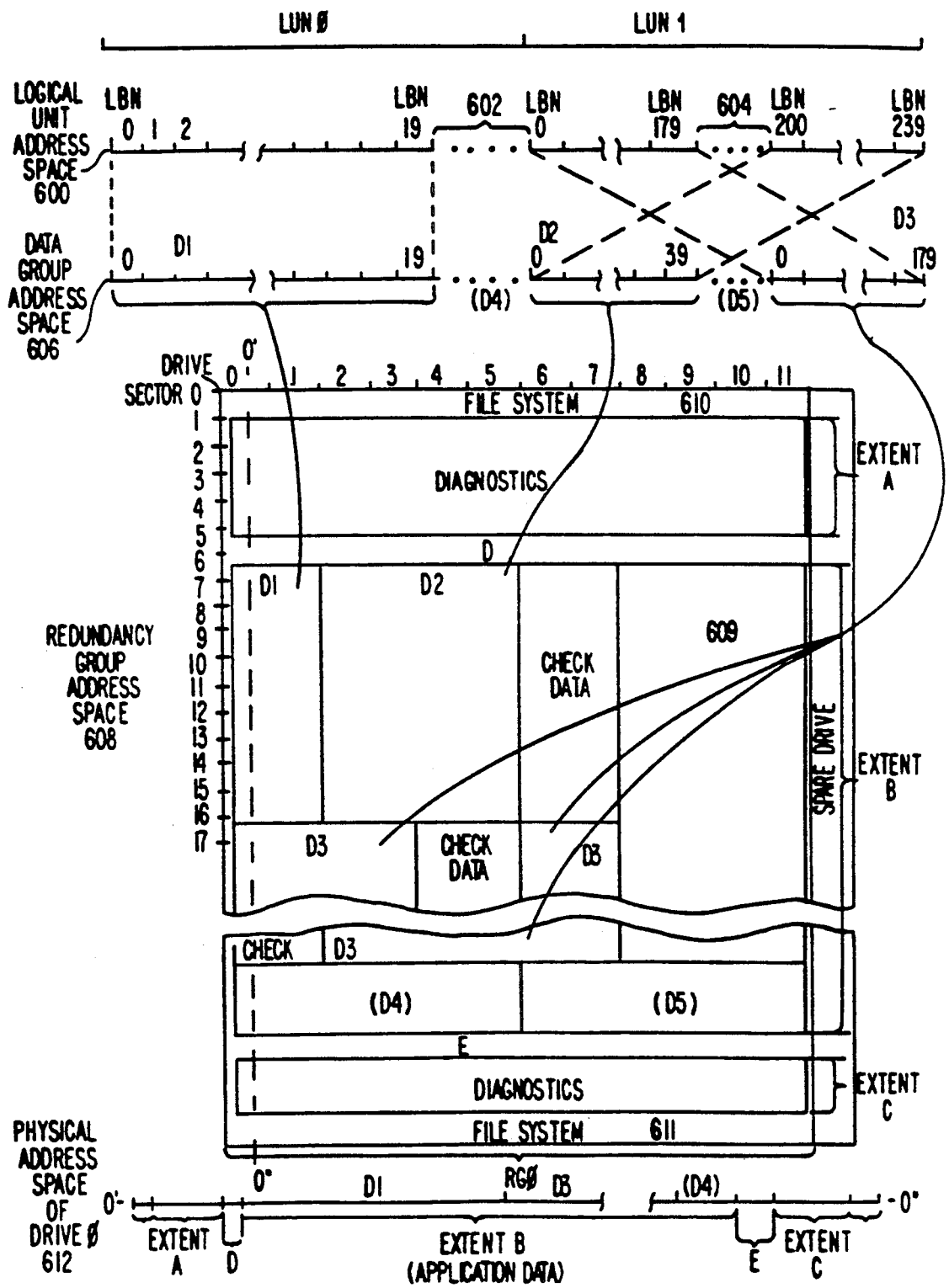
FIG. 6 is a diagram showing how the memory space of a device set might be configured in accordance with the principles, of the present invention.

FIG. 6 illustrates an example of how application units, data groups and redundancy groups might be mapped to a device set such as parallel array 201 or 202, at initialization of the parallel array.

Referring first to the linear graph 600 of logical unit address space, this graph represents the mass data storage memory of the parallel array as it would appear to the application software of a CPU operating system. In the particular example of FIG. 6, the parallel array has been configured to provide a logical unit address space comprising two application (logical) units (LUN0 and LUN1). Logical unit LUN0 is configured to include 20 addressable logical blocks having logical block numbers LBN0-LBN19. As shown by FIG. 6, logical unit LUN0 also includes an unmapped logical address space 602 that is reserved for dynamic configuration. Dynamic configuration means that during run time of the parallel array the CPU application software can request to change the configuration of the parallel array from its initial configuration. In the example of FIG. 6, unmapped spaces 602 and 604 are reserved respectively in each of logical units LUN0 and LUN1 to allow a data group to be added to each logical unit without requiring that either logical unit be taken off line. Such dynamic configuration capability can be implemented by providing a messaging service for a CPU application to request the change in configuration. On behalf of mass storage system 200, the messaging service can be handled, for example, by the device controllers 218 and 220. Logical unit LUN1 includes a plurality of addressable logical blocks LBN0-LBN179 and LBN200-LBN239. The logical blocks LBN180-LBN199 are reserved for dynamic configuration, and in the initial configuration of the parallel array, as shown in FIG. 6, are not available to the application software.

The mass storage address space of logical unit LUN0 comprises a single data group D1, as shown by data group address space chart 606. Data group D1 includes 20 logically contiguous data blocks 0-19, configured as shown in FIG. 4 and corresponding one to one with logical block numbers LBN0-LBN19. Logical unit LUN1 includes two data groups D2 and D3, comprising respectively 40 data blocks numbered 0-39 corresponding to logical blocks LBN200-239 of logical unit LUN1, and 180 data blocks numbered 0-179 corresponding to logical blocks LBN0-LBN179 of logical unit LUN1. As shown by the example of FIG. 6, the logical blocks of a logical unit can be mapped as desired to the data blocks of one or more data groups in a variety of ways. Data group address space 606 also includes additional data groups (D4) and (D5) reserved for dynamic configuration. These data groups can be formatted on the disk drives of the parallel array at initialization or at any time during the run time of the parallel array, but are not available to the application software in the initial configuration of the parallel array.

The redundancy group configuration of the parallel array is illustrated by a two dimensional address space 608, comprising the entire memory space of the parallel array. The horizontal axis of address space 608 represents the thirteen physical drives of the parallel array, including the twelve drives of active set 230 and the one spare drive of backup set 232. In FIG. 6, the drives of the active set are numbered 0-11 respectively to reflect their logical positions in the parallel array. The vertical axis of address space 608 represents the sectors of each physical drive. As shown by redundancy group address space 608, the parallel array has been configured as one redundancy group RG0 having three extents A, B and C. As can be seen, the width of each extent is equal to that of the redundancy group RG0: 12 logical drive positions or, from another perspective, the entire width of active set 230.

Extent A of redundancy group RG0 includes sectors 1-5 of drives 0-11. Thus, extent A of redundancy group RG0 has a width of 12 spindles, and an extent depth of 5 sectors. In the example of FIG. 6, extent A is provided as memory space for diagnostic programs associated with mass storage system 200. Such diagnostic programs may configure the memory space of extent A in numerous ways, depending on the particular diagnostic operation being performed. A diagnostic program may, for example, cause a portion of another extent to be reconstructed within the boundaries of extent A, including application data and check data.

Extent B of redundancy group RG0 includes all application data stored on the parallel array. More particularly, in the example of FIG. 6, extent B includes data groups D1, D2 and D3 configured as shown in FIG. 4, as well as additional memory space reserved for data groups (D4) and (D5), and a region 609 of memory space not mapped to either logical unit LUN0 or LUN1. This region 609 may, for example, be mapped to another logical unit (e.g., LUN2) being used by another application.

Address space 608 also includes a third extent C in which a second diagnostic field may be located. Although the parallel array is shown as including only a single redundancy group RG0, the parallel array may alternatively be divided into more than one redundancy group. For example, redundancy group RG0 might be limited to a width of 8 spindles including logical drive positions 0-7, such as is shown in FIGS. 4 and 5, and a second redundancy group might be provided for logical drive positions 8–11.

It is also not necessary that the entire depth of the parallel array be included in redundancy group RGO. As an example, FIG. 6 shows that above and below redundancy group RGO are portions 610 and 611 of memory space 608 that are not included in the redundancy group. In the example of FIG. 6, portions 610 and 611 contain data structures reflecting the configuration of the parallel array. These data structures are described in greater detail below in connection with FIG. 7. In addition, any portion of memory space between array extents A, B and C, such as the portions indicated by regions D and E in FIG. 6, may be excluded from redundancy group RGO.

FIG. 6 further provides a graph 612 showing a linear representation of the physical address space of the drive in logical position 0. Graph 612 represents a sectional view of address space chart 610 along line 0'-0'', and further illustrates the relationship of the various logical levels of the present invention as embodied in the exemplary parallel array configuration of FIG. 6.

As stated previously, the parallel array can be configured by the operator initially at installation time and/or during run-time of the parallel array. The operator formats and configures the application units he desires to use by first determining the capacity, performance and redundancy requirements for each unit. These considerations have been previously discussed herein. Once the capacity, performance and redundancy requirements have been defined, the logical structure of the units can be specified by defining parameters for each of the logical layers (redundancy group layer, data group layer and application unit layer). These parameters are provided to a configuration utility program executed by processor 216a of parallel array controller 216. The configuration utility manages a memory resident database of configuration information for the parallel array. Preferably, a copy of this database information is kept in non-volatile memory to prevent the information from being lost in the event of a power failure affecting the parallel array. A format utility program executed by processor 216a utilizes the information in this database as input parameters when formatting the physical drives of the parallel array as directed by the operator.

The basic parameters defined by the configuration database preferably include the following:

1) For each redundancy group:
| | |
|---|---|
| Type: | Mirrored; Two check drives; One check drive; No check drive. |
| Width: | The number of logical drive positions as spindles in the redundancy group. |
| Extent Size: | For each extent of the redundancy group, the size (depth) of the extent in sectors |
| Extent Base: | For each extent of the redundancy group the physical layer address of the first sector in the extent. |
| Stripe Depth: | For interleaved check drive groups, the depth, in sectors, of a stripe of check data. |
| Drives: | An identification of the physical drives included in the redundancy group. |
| Name: | Each redundancy group has a name that is unique across the mass storage system 200. |

2) For each data group:
| | |
|---|---|
| Base: | The index (logical drive number) of the drive position within the redundancy group that is the first drive position in the data group within the redundancy group. |
| Width: | The number of drive positions (logical drives) in the data group. This is the number of sectors across in the data group address space. |
| Start: | The offset, in sectors, within the redundancy group extent where the data group rectangle begins on the logical drive position identified by the base parameter. |
| Depth: | The number if sectors in a vertical column of the data group, within the redundancy group extent. Depth and width together are the dimensions repectively of the side and the top of the rectangle formed by each data group as shown in FIGS. 4–6. |
| Redundancy Group: | The name of the redundancy group to which the data group belongs. |
| Extent Number: | A name or number identifying the extent in which the data group is located. |
| Index: | The configuration utility will assign a number to each data group, unique within its redundancy group. This number will be used to indentify the data group later, for the format utility and at run-time. |
| Data Group Stripe Depth: | The depth, in sectors, of logically contiguous blocks of data within each stripe of data in the data group. |

3) For each application unit:
| | |
|---|---|
| Size: | Size in sectors |
| Data Group List: | A list of the data groups, and their size and order, within the unit address space, and the base unit logical address of each data group. Each group is indentified by the name of the redundancy group it is in and its index. |

Figure 7:
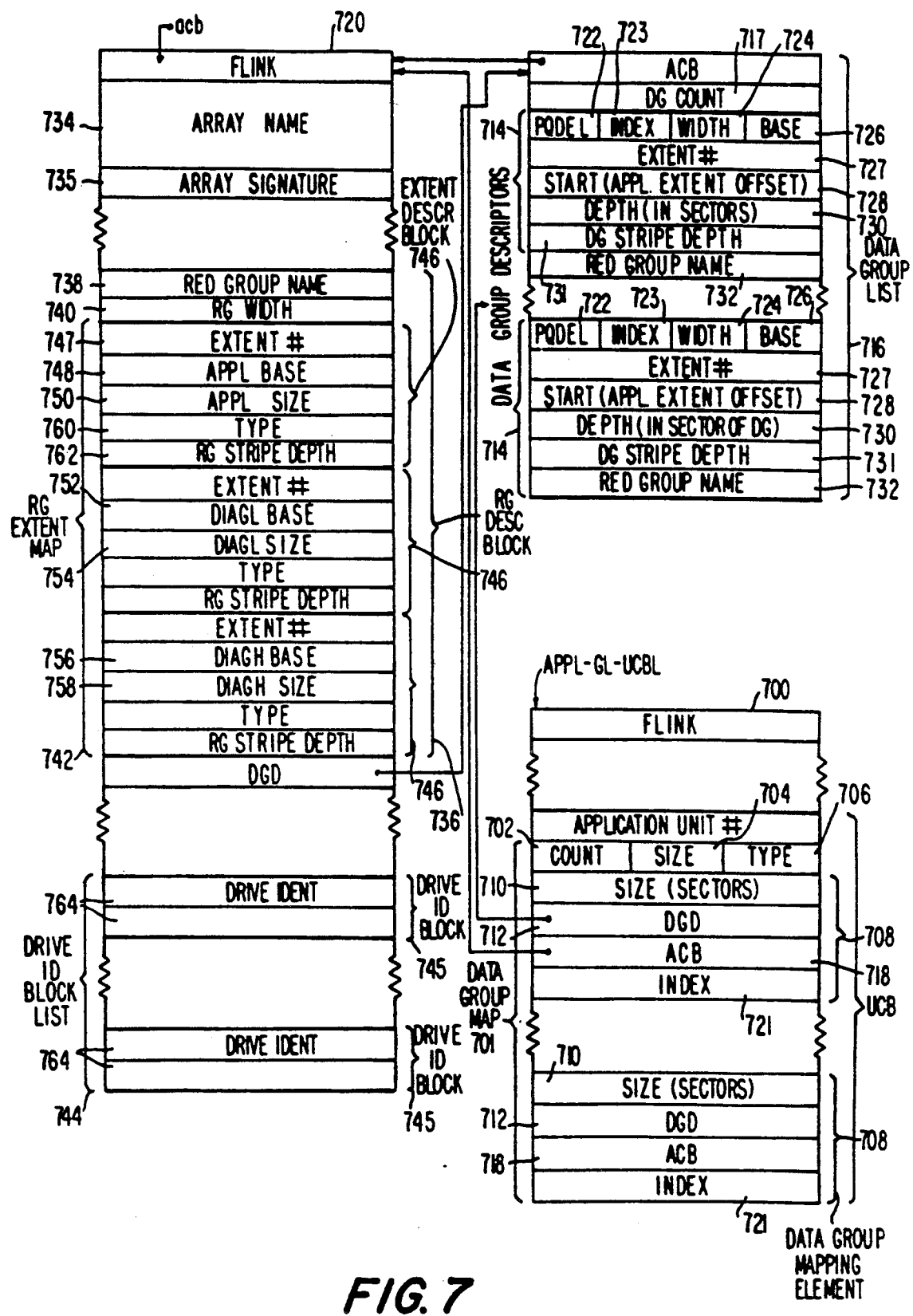
FIG. 7 is a diagram of an exemplary embodiment of data structures for mapping between the logical levels of the present invention.

FIG. 7 illustrates exemplary data structures containing the above-described parameters that can be used in implementing the configuration database of a device set such as parallel array 201 or 202. These data structures may be varied as desired to suit the particular device set embodiment to which they are applied. For example, the data structures described hereafter allow for many options that may be unused in a particular device set, in which case the data structures may be simplified.

The configuration database includes an individual unit control block (UCB) for each application unit that references the parallel array (a unit may map into more than one parallel array). These UCB's are joined together in a linked list 700. Each UCB includes a field labeled APPLICATION UNIT # identifying the number of the application unit described by that UCB. Alternatively, the UCB's within link list 700 might be identified by a table of address pointers contained in link list 700 or in some other data structure in the program memory of microprocessor 216a. Each UCB further includes a map 701 of the data groups that are included in that particular application unit. Data group map 701 includes a count field 702 defining the number of data groups within the application unit, a size field 704 defining the size of the application unit in sectors, and a type field 706 that defines whether the linear address space of the application unit is continuous (relative addressing) or non-continuous (absolute addressing). A non-continuous address space is used to allow portions of the application unit to be reserved for dynamic configuration as previously described in connection with data groups (D4) and (D5) of FIG. 4.

Data group map 701 further includes a data group mapping element 708 for each data group within the application unit. Each data group mapping element 708 includes a size field 710 defining the size in sectors of the corresponding data group, a pointer 712 to a descriptor block 714 within a data group list 716, a pointer 718 to an array control block 720, and an index field 721. The data group mapping elements 708 are listed in the order in which the data blocks of each data group map to the LBN's of the application unit. For example, referring to LUN1 of FIG. 6, the mapping element for data group D3 would be listed before the data group mapping element for data group D2. Where the address space of the application unit is non-continuous, as in the case of LUN1 of FIG. 6, data group map 701 may include mapping elements corresponding to, and identifying the size of, the gaps between available ranges of LBN's.

Data group list 716 includes a descriptor block 714 for each data group within the parallel array, and provides parameters for mapping each data group to the redundancy group and redundancy group extent in which it is located. Data group list 716 includes a count field 717 identifying the number of descriptor blocks in the list. In the case of a redundancy group having a striped check data configuration, each data group descriptor block 714 may include a "pqdel" field 722 that defines the offset of the first data block of the data group from the beginning of the check data for the redundancy group stripe that includes that first data block. The value of pqdel field 722 may be positive or negative, depending on the relative positions of the drive on which the first data block of the data group is configured and the corresponding check data drives for the redundancy group stripe including that first data block. This value can be useful for assisting the parallel array controller in determining the position of the check data during I/O operations.

Each data group descriptor block 714 also includes an index field 723 (same value as index field 721), a width field 724, a base field 726, an extent number field 727, a start field 728, a depth field 730, a data group stripe depth field 731 and a redundancy group name field 732 that respectively define values for the corresponding parameters previously discussed herein.

Array control block 720 provides a map of redundancy groups of the parallel array to the physical address space of the drives comprising the parallel array. Array control block 720 includes an array name field 734 and one or more fields 735 that uniquely identify the present configuration of the parallel array. Array control block 720 also includes a list of redundancy group descriptor blocks 736. Each redundancy group descriptor block 736 includes a redundancy group name field 738 identifying the redundancy group corresponding to the descriptor block, a redundancy group width field 740 and a redundancy group extent map 742. Array control block 720 further includes a list 744 of physical drive identifier blocks 745.

For each extent within the redundancy group, redundancy group extent map 742 includes an extent descriptor block 746 containing parameters that map the extent to corresponding physical address in the memory space of the parallel array, and define the configuration of redundant information in the extent. As an example, extent descriptor blocks are shown for the three extents of redundancy group RG0 of FIG. 6, each extent descriptor block including an extent number field 747 and base and size fields defining the physical addresses of the corresponding extent. Application data base and size fields 748 and 750 correspond respectively to the base and size of extent B of redundancy group RG0; diagnostic (low) base and size fields 752 and 754 correspond respectively to the base and size of extent A of redundancy group RG0; and diagnostic (high) base and size fields 756 and 758 correspond respectively to the base and size of extent C of redundancy group RG0.

Each extent descriptor block 746 also includes a type field 760 that defines the type of redundancy implemented in the extent. For example, a redundancy group extent may be implemented by mirroring or shadowing the mass storage data stored in the data group(s) within the extent (in which case, the extent will have an equal number of data drives and redundant drives). Alternatively, a Reed-Solomon coding algorithm may be used to generate check data on one drive for each redundancy group stripe within the extent, or a more sophisticated Reed-Solomon coding algorithm may be used to generate two drives of check data for each redundancy group stripe. Type field 760 may specify also whether the check data is to be striped throughout the extent, and how it is to be staggered (e.g., the type field might index a series of standardized check data patterns, such as a pattern in which check data for the first redundancy group stripe in the extent is located on the two numerically highest logical drive positions of the redundancy group, check data for the second redundancy group stripe in the extent is located on the next two numerically highest logical drive positions, and so on). Yet another alternative is that type field 760 indicates that no check drives are included in the initial configuration of the redundancy group extent. This may be desired, for example, if the redundancy group extent is created for use by diagnostic programs. A redundancy group extent of this type was previously discussed in connection with extent A of redundancy group RG0 shown in FIG. 6.

Each extent descriptor block 746 may further include a redundancy group stripe depth field 762 to specify, if appropriate, the depth of redundancy group stripes within the extent.

List 744 of physical drive identifier blocks 745 includes an identifier block 745 for each physical drive in the parallel array. Each identifier block 745 provides information concerning the physical drive and its present operating state, and includes in particular one or more fields 764 for defining the logical position in the parallel array of the corresponding physical drive.

To summarize briefly the intended functions of the various data structures of FIG. 7, the unit control blocks of link list 700 define the mapping of application units to data groups within the parallel array. Mapping of data groups to redundancy groups is defined by data group list 716, and mapping of redundancy groups to the physical address space of the memory of the parallel array is defined by array control block 720.

When each physical disk of the parallel array is formatted by the formatting utility, a copy of the array control block 720, link list 700 and data group list 716 are stored on the drive. This information may be useful for various operations such as reconstruction of a failed drive. A copy of the configuration database also may be written to the controller of another parallel array, such that if one parallel array should fail, another would be prepared to take its place.

During each I/O request to a parallel array, the mapping from unit address to physical address spaces must be made. Mapping is a matter of examining the configuration database to translate: (1) from a unit logical address span specified in the I/O request to a sequence of data group address spans; (2) from the sequence of data group address spans to a set of address spans on logical drive positions within a redundancy group; and then (3) from the set of address spans on logical drive positions to actual physical drive address spans. This mapping process can be done by having an I/O request server step through the data structures of the configuration database in response to each I/O request. Alternatively, during initialization of the parallel array the configuration utility may, in addition to generating the configuration database as previously described, generate subroutines for the I/O request server for performing a fast mapping function unique to each data group. The particular manner in which the I/O request server carries out the mapping operations is implementation specific, and it is believed to be within the skill of one in the art to implement an I/O request server in accordance with the present invention as the invention is described herein.

The following is an example of how the I/O request server might use the data structures of FIG. 7 to map from a logical unit address span of an application I/O request to a span or spans within the physical address space of a parallel array. The logical unit address span is assumed to be defined in the I/O request by a logical application unit number and one or more LBN's within that application unit.

The I/O request server determines from the I/O request the application unit being addressed and whether that application unit references the parallel array. This latter determination can be made by examining link list 700 for a UCB having an APPLICATION UNIT # corresponding to that of the I/O request. If an appropriate UCB is located, the I/O request server next determines from the LBN(s) specified in the I/O request the data group or data groups in which data block(s) corresponding to those LBN(s) are located. This can be accomplished by comparing the LBN(s) to the size fields 710 of the mapping elements in data group map 701, taking into account the offset of that size field from the beginning of the application unit address space (including any gaps in the application unit address space). For example, if the size value of the first data group mapping element in map 701 is greater than the LBN(s) of the I/O request, then it is known that the LBN(s) correspond to data blocks in that data group. If not, then the size value of that first mapping element is added to the size value of the next mapping element in map 701 and the LBN(s) are checked against the resulting sum. This process is repeated until a data group is identified for each LBN in the I/O request.

Having identified the appropriate data group(s), the I/O request server translates the span of LBN's in the I/O request into one or more spans of corresponding data block numbers within the identified data group(s). The configuration utility can then use the value of index field 706 and pointer 712 within each mapping element 708 corresponding to an identified data group to locate the data group descriptor block 714 in data group list 716 for that data group. The I/O request server uses the parameters of the data group descriptor block to translate each span of data block numbers into a span of logical drive addresses.

First, the I/O request server determines the logical drive position of the beginning of the data group from the base field 726 of the data group descriptor block 714. The I/O request server also determines from fields 732 and 727 the redundancy group name and extent number in which the data group is located, and further determines from start field 728 the number of sectors on the drive identified in base field 726 between the beginning of that redundancy group extent and the beginning of the data group. Thus, for example, if the I/O request server is reading the descriptor block for data group D3 configured as shown in FIG. 6, base field 726 will indicate that the data group begins on logical drive position 0, redundancy name field 732 will indicate that the data group is in redundancy group RG0, extent field 727 will indicate that the data group is in extent B, and start field 728 will indicate that there is an offset of 10 sectors on logical drive 0 between the beginning of extent B and the first data block of data group D3.

Knowing the logical drive position and extent offset of the first data block of the data group, the I/O request server then determines the logical drive position and extent offset for each sequence of data blocks in the data group corresponding to the LBN's of the I/O request. To do this, the I/O request server may use the values of width field 724, depth field 730 and data group stripe depth field 731. If any check data is included within the rectangular boundaries of the data group, the position of the check data is taken into account if necessary in determining the logical drive position and extent offset address spans of the data blocks. This can be accomplished using information from array control block 720. More particularly, the I/O request server can determine the logical drive position and extent offset of any check data within the boundaries of the data group by examining the type field 760 and the redundancy group stripe depth field 762 of the appropriate redundancy group extent descriptor block 746 (the I/O request server can determine which extent descriptor block 746 is appropriate by finding the extent descriptor block 746 having an extent number field 747 that matches the corresponding extent number field 727 in the data group's descriptor block 714). The I/O request server is directed to array control block 720 by the pointer 718 in the data group mapping element 708.

To translate each logical drive position and extent offset address span to a physical address span on a particular physical drive of the parallel array, the I/O request server reads the physical drive identifier blocks 745 to determine the physical drive corresponding to the identified logical drive position. The I/O request server also reads the base field of the appropriate extent descriptor block 746 of array control block 720 (e.g., application base field 752), which provides the physical address on the drive of the beginning of the extent. Using the extent offset address span previously determined, the I/O request server can then determine for each physical drive the span of physical addresses that corresponds to the identified extent offset address span.

It may occur that during operation of a parallel array one or more of the physical drives is removed or fails, such that the data on the missing or failed drive must be reconstructed on a spare drive. In this circumstance, the configuration of the array must be changed to account for the new drive, as well as to account for temporary array changes that must be implemented for the reconstruction period during which data is regenerated from the missing or failed drive and reconstructed on the spare. The details of such regeneration and reconstruction operations are not within the scope of the present invention. It is noted, however, that the configuration utility can be used to remap the array configuration by redefining the parameters of the configuration database.

Thus it is seen that a mass storage apparatus, made up of a plurality of physical storage devices, which could provide both high bandwidth and high operation rate, as necessary, along with high reliability, is provided. One skilled in the art will appreciate that the present invention can be practiced by other than the described embodiments, which are presented for purposes of illustration and not of limitation, and the present invention is limited only by the claims which follow.

What is claimed is:

1. A mass data storage apparatus for storing mass storage data for a plurality of application programs running on data processing devices, said mass storage apparatus comprising:

a set of physical mass storage devices, each physical mass storage device comprising a physical memory space divided into physical storage units; and array controller means connected to said set for operatively interconnecting said set to form a composite memory space comprising the combined physical storage units of said physical mass storage devices, said array controller means including means for configuring groups of said physical storage units within defined boundaries in said composite memory space into a plurality of redundancy groups to provide in each redundancy group a predetermined arrangement of physical data storage units for storing mass storage data received from said application programs and physical redundant information storage units for storing redundant information associated with said received mass storage data, means for assigning sequential logical addresses to selected ones of the physical data storage units within each redundancy group to arrange said selected units in a logically contiguous data group having a configuration independent of said redundancy group in which said data group is formed, means for correlating the sequential logical addresses of each data group to logical addresses in one of a plurality of logical mass storage units addressable by said application programs, means responsive to I/O service requests from said application programs addressing logical address spans in said logical mass storage units for mapping said spans to sequences of logical addresses within said data groups to which said spans have been correlated by said correlating means, and for mapping said sequences to physical data storage units to which said sequences have been assigned by said assigning means, and means responsive to receipt of mass storage data from said application programs for storing said received mass storage data in physical data storage units identified by said mapping means and for storing redundant information associated with said received mass storage data in physical redundant information storage units related to said identified physical data storage units by said redundancy group configuring means, whereby said composite memory space is organized at a first logical level as a plurality of redundancy groups, each of said redundancy groups including at a second logical level at least one independently configurable data group, each data group capable of operating as a separate logical mass data storage device.

2. The mass data storage apparatus of claim 1, wherein each redundancy group comprises a plurality of data groups.

3. The mass data storage apparatus of claim 2, wherein a data group can be characterized by a data group width to achieve a desired bandwidth or request rate.

4. The mass data storage apparatus of claim 3, wherein at least two data groups have different widths.

5. The mass data storage apparatus of claim 2, wherein at least two data groups have different lengths.

6. The mass data storage apparatus of claim 2, wherein at least two data groups have different bases.

7. The mass data storage apparatus of claim 1 further comprising a third logical level, wherein at least one data group from each of at least two of the plurality of redundancy groups are combined to form a single logical mass data storage device.

8. The mass data storage apparatus of claim 1, wherein for at least one of the plurality of redundancy groups redundancy is provided by check data comprising code words, the code words being stored in at least one check drive included in at least one redundancy group.

9. The mass data storage apparatus of claim 8, wherein each of the at least one check drive is a physical mass storage device.

10. The mass data storage apparatus of claim 8, wherein each of the at least one check drive is a logical mass storage device comprising portions of a plurality of physical mass storage devices.

11. The mass data storage apparatus of claim 10, wherein code words are distributed across the redundancy group.

12. The mass data storage apparatus of claim 1, wherein for at least one of the plurality of redundancy groups redundancy is provided by mirroring.

13. The mass data storage apparatus of claim 12, wherein redundancy data is stored in at least one redundant drive included in the redundancy group.

14. The mass data storage apparatus of claim 13, wherein each of the at least one redundant drive is a physical mass storage device.

15. The mass data storage apparatus of claim 13, wherein each of the at least one redundant drive is a logical mass storage device comprising portions of a plurality of physical mass storage devices.

16. The mass data storage apparatus of claim 15, wherein redundant data is distributed across the redundancy group.

17. The mass data storage apparatus of claim 1, wherein a redundancy group can be characterized by a redundancy group width to achieve a desired data capacity for the redundancy group.

18. The mass data storage apparatus of claim 17, wherein at least two redundancy groups have different group widths.

19. The mass data storage apparatus of claim 1, wherein each data block comprises a sector of data memory on a disk drive.

20. The mass data storage apparatus of claim 1, wherein at least one of said data groups comprises physical data storage units from a plurality of physical mass storage devices.

21. The mass data storage apparatus of claim 1, wherein each of said data groups comprises physical data storage units from a plurality of physical mass storage devices.

22. A mass data storage apparatus for storing mass storage data for a plurality of application programs running on data processing devices, said mass storage apparatus comprising:
  a set of physical mass storage devices, each physical mass storage device comprising a physical memory space divided into physical storage units; and
  array controller means connected to said set for operatively interconnecting said set to form a composite memory space comprising the combined physical storage units of said physical mass storage devices, said array controller means including
    means for configuring a group of said physical storage units within a defined boundary in said composite memory space into a redundancy group to provide within the redundancy group a predetermined arrangement of physical data storage units for storing mass storage data received from said application programs and physical redundant information storage units for storing redundant information associated with said received mass storage data,
    means for assigning sequential logical addresses in groups to selected ones of the physical data storage units within said redundancy group to arrange said units in a plurality of data groups having configurations independent of said redundancy group,
    means for correlating the sequential logical addresses of said data groups to logical addresses in respective ones of a plurality of logical mass storage units addressable by said application programs,
    means responsive to I/O service requests from said application programs addressing spans of logical addresses in said logical mass storage units for mapping said spans to sequences of logical addresses within said data groups with which said spans have been correlated by said correlating means, and for mapping said sequences to physical data storage units to which said sequences have been assigned by said assigning means, and
    means responsive to receipt of mass storage data from said application programs for storing said received mass storage data in physical data storage units identified by said mapping means and for storing redundant information associated with said received mass storage data in physical redundant information storage units related to said identified physical data storage units by said redundancy group configuring means, whereby said composite memory space is organized at a first logical level as at least one redundancy group, each of said at least one redundancy device group including at a second logical level a plurality of independently configurable data groups, each data group capable of operating as a separate logical mass data storage device.

23. The mass data storage apparatus of claim 22, wherein the set of physical mass storage devices comprises at the first logical level a plurality of redundancy groups.

24. The mass data storage apparatus of claim 23, further comprising a third logical level, wherein at least one data group from each of at least two of the plurality of redundancy groups are combined to form a single logical mass data storage device.

25. The mass data storage apparatus of claim 24, wherein at least two data groups have different widths.

26. The mass data storage apparatus of claim 23, wherein for at least one of the plurality of redundancy groups redundancy is provided by check data comprising code words, the code words being stored in at least one check drive included in the redundancy group.

27. The mass data storage apparatus of claim 26, wherein each of the at least one check drive is a physical mass storage device.

28. The mass data storage apparatus of claim 26, wherein each of the at least one check drive is a logical mass storage device comprising portions of a plurality of physical mass storage devices.

29. The mass data storage apparatus of claim 28, wherein code words are distributed across the redundancy group.

30. The mass data storage apparatus of claim 23, wherein for at least one of the plurality of redundancy groups redundancy is provided by mirroring.

31. The mass data storage apparatus of claim 30, wherein redundancy data is stored in at least one redundant drive included in the redundancy group.

32. The mass data storage apparatus of claim 31, wherein each of the at least one redundant drive is a physical mass storage device.

33. The mass data storage apparatus of claim 31, wherein each of the at least one redundant drive is a logical mass storage device comprising portions of a plurality of physical mass storage devices.

34. The mass data storage apparatus of claim 33, wherein redundant data is distributed across the redundancy group.

35. The mass data storage apparatus of claim 23, wherein a data group can be characterized by a data group width to achieve a desired bandwidth or request rate.

36. The mass data storage apparatus of claim 23, wherein at least two data groups have different lengths.

37. The mass data storage apparatus of claim 23, wherein at least two data groups have different bases.

38. The mass data storage apparatus of claim 22, wherein a redundancy group can be characterized by a redundancy group width to achieve a desired data capacity for the redundancy group.

39. The mass data storage apparatus of claim 22, wherein at least two redundancy groups have different group widths.

40. The mass data storage apparatus of claim 22, wherein each data block comprises a sector of data memory on a disk drive.

41. The mass data storage apparatus of claim 22, wherein at least one of said data groups comprises physical data storage units from a plurality of physical mass storage devices.

42. The mass data storage apparatus of claim 22, wherein each of said data groups comprises physical data storage units form a plurality of physical mass storage devices.

* * * * *

UNITED STATES PATENT AND TRADEMARK OFFICE
CERTIFICATE OF CORRECTION

PATENT NO. : 5,166,939

DATED : November 24, 1992

INVENTOR(S) : David H. Jaffe et al.

It is certified that error appears in the above-identified patent and that said Letters Patent is hereby corrected as shown below:

Column 5, line 14, "200" should be --201--.

Column 12, line 12, "if" should be --of--.

Column 12, line 15, "repectively" should be --respectively--.

Column 12, line 34, "indentified" should be --identified--.

Column 13, line 6, "7!8" should be --718--.

Column 20, line 65, "form" should be --from--.

Signed and Sealed this

Eighteenth Day of October, 1994

Attest:

BRUCE LEHMAN

Attesting Officer

Commissioner of Patents and Trademarks